United States Patent
Bourvellec et al.

(10) Patent No.: US 12,023,845 B2
(45) Date of Patent: Jul. 2, 2024

(54) METHOD FOR ORIENTING A PREFORM IN A MOLD

(71) Applicant: SIDEL PARTICIPATIONS, Octeville-sur-Mer (FR)

(72) Inventors: Loïc Bourvellec, Octeville-sur-Mer (FR); Hervé Pasquier, Octeville-sur-Mer (FR); Marc Mouchelet, Octeville-sur-Mer (FR)

(73) Assignee: SIDEL PARTICIPATIONS, Octeville-sur-Mer (FR)

( * ) Notice: Subject to any disclaimer, the term of this patent is extended or adjusted under 35 U.S.C. 154(b) by 0 days.

(21) Appl. No.: 17/777,138

(22) PCT Filed: Nov. 17, 2020

(86) PCT No.: PCT/EP2020/082402
§ 371 (c)(1),
(2) Date: May 16, 2022

(87) PCT Pub. No.: WO2021/099314
PCT Pub. Date: May 27, 2021

(65) Prior Publication Data
US 2022/0396023 A1   Dec. 15, 2022

(30) Foreign Application Priority Data
Nov. 20, 2019 (FR) ..................................... 1912942

(51) Int. Cl.
*B29C 49/42* (2006.01)
*B29C 49/58* (2006.01)
(Continued)

(52) U.S. Cl.
CPC ........ *B29C 49/42119* (2022.05); *B29C 49/58* (2013.01); *B29C 49/78* (2013.01);
(Continued)

(58) Field of Classification Search
CPC ............... B29C 49/42; B29C 49/42119; B29C 2049/5827; B29C 49/58; B29C 2049/78675; B29C 49/36
See application file for complete search history.

(56) References Cited

U.S. PATENT DOCUMENTS 5,756,018 A * 5/1998 Valyi ..................... B29C 49/071
215/375
5,803,291 A 9/1998 Valles
(Continued)

FOREIGN PATENT DOCUMENTS

| EP | 3181328 A1 | 6/2017 | | |
|---|---|---|---|---|
| WO | WO-2016092046 A2 | * | 6/2016 | ......... B29C 49/6436 |
| WO | WO-2019211557 A1 | * | 11/2019 | ............. B29C 49/08 |

OTHER PUBLICATIONS

Machine translation of EP 3181328 A1 dated Jun. 2017. (Year: 2017).*
(Continued)

*Primary Examiner* — Robert B Davis

(57) ABSTRACT

A method for orienting a preform of axis in a forming mold of a blowing machine, a neck of the preform being provided with at least one marker, the method including (i) installing the preform in the mold; (ii) detecting the current angular position of the preform by determining the angle of rotation through which the preform has to be rotated to reach the reference angular position thereof; and (iii) orienting the preform about the axis thereof in relation to the mold until a reference angular position is reached.

19 Claims, 5 Drawing Sheets

(51) Int. Cl.
*B29C 49/78* (2006.01)
*B29K 67/00* (2006.01)
*B29L 31/00* (2006.01)

(52) U.S. Cl.
CPC ............... *B29C 2049/5827* (2013.01); *B29C 2049/78765* (2022.05); *B29K 2067/003* (2013.01); *B29L 2031/7158* (2013.01)

(56) References Cited

U.S. PATENT DOCUMENTS

| | | |
|---|---|---|
| 6,464,486 B1 | 10/2002 | Barray |
| 2003/0020193 A1* | 1/2003 | Hamamoto ......... B29C 49/4205 425/534 |
| 2003/0077349 A1 | 4/2003 | Derouault |
| 2012/0089252 A1* | 4/2012 | Kwirandt ............ B29C 49/4252 348/94 |
| 2017/0028610 A1* | 2/2017 | Gerhards ............ B29C 49/4236 |
| 2018/0264707 A1* | 9/2018 | Schill ..................... B29C 49/62 |

OTHER PUBLICATIONS

Mechanical translation of Huttner et al (WO 2016092046A2) dated Jun. 2016. (Year: 2016).*
International search report dated Feb. 3, 2021.

* cited by examiner

[Fig. 1]
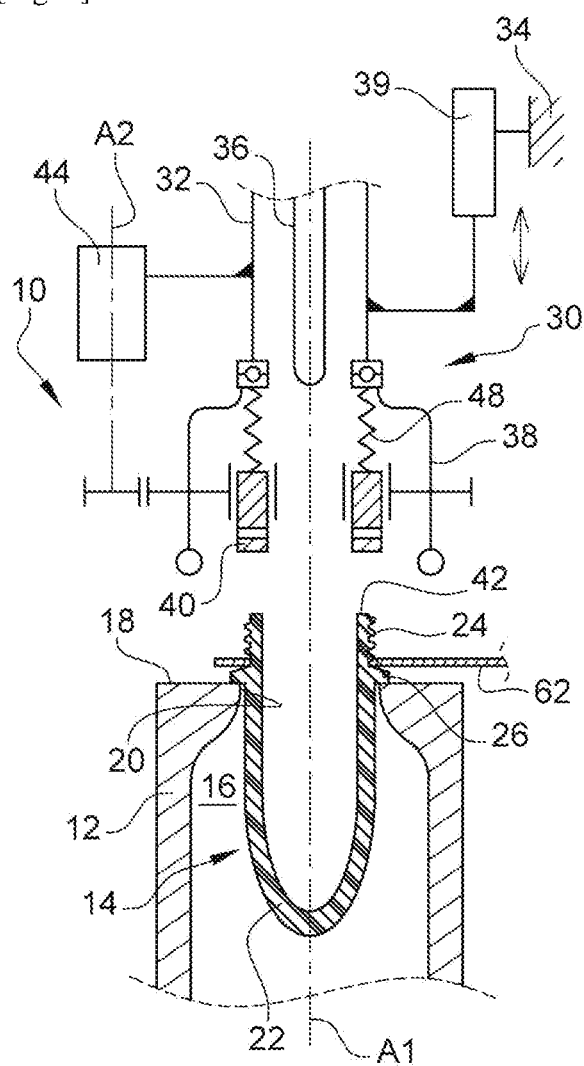

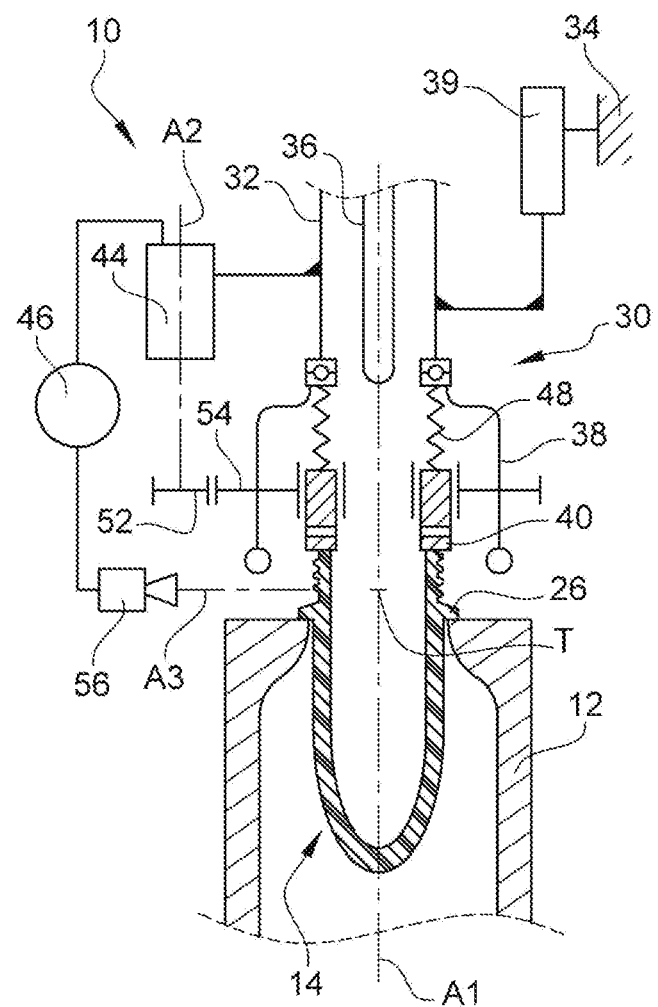
[Fig. 2]

[Fig. 3]
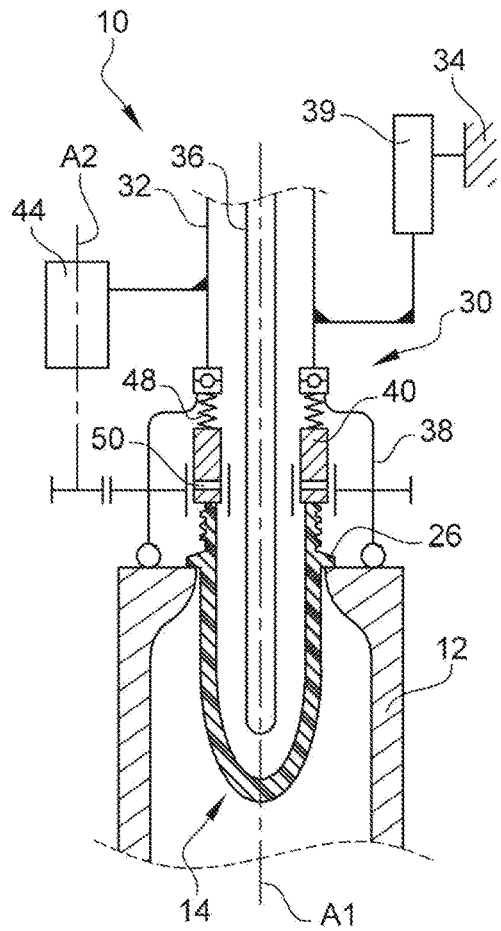
[Fig. 4]
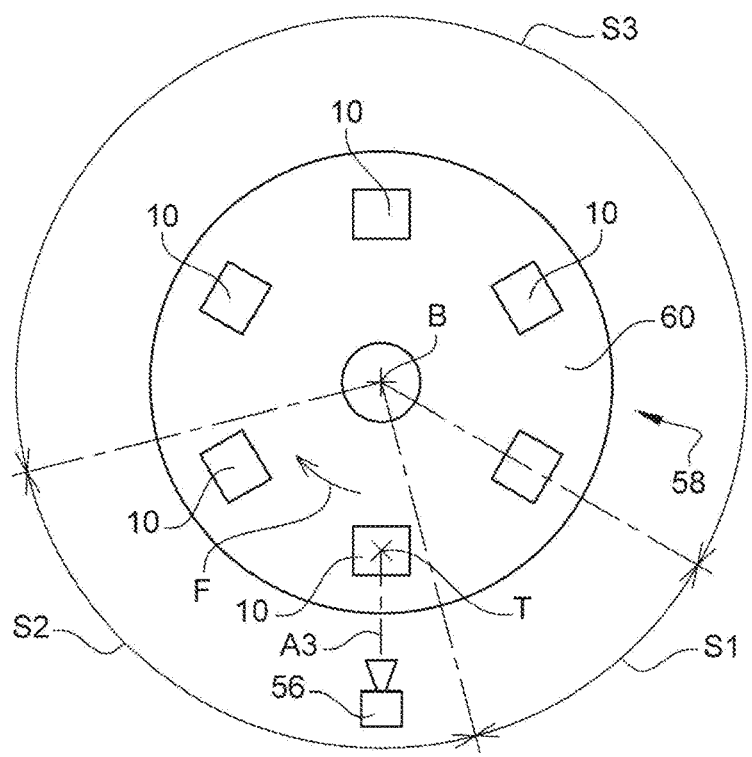

[Fig. 5]
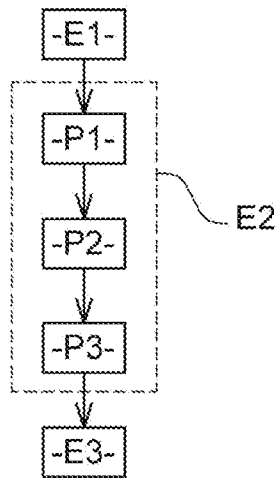
[Fig. 6]
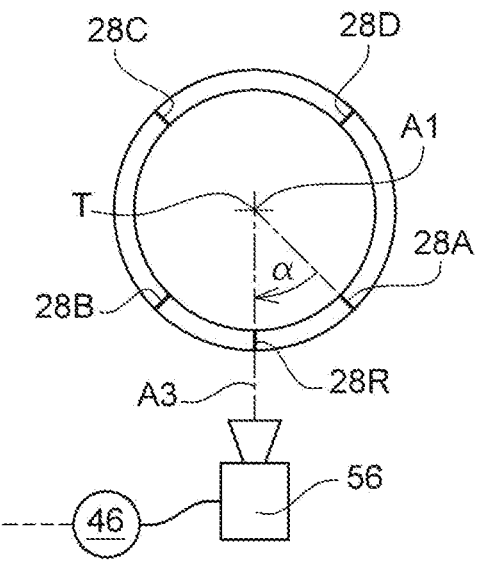
[Fig. 7]
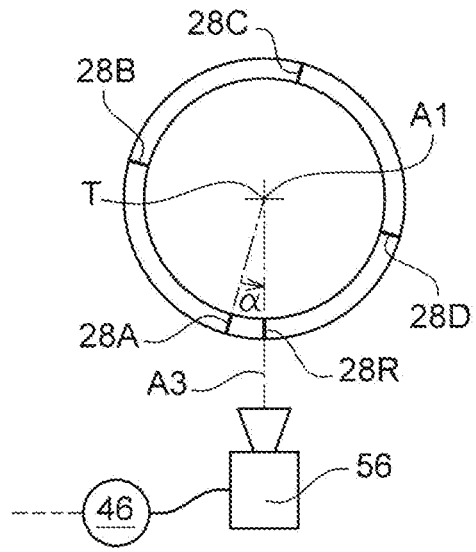

[Fig. 8]
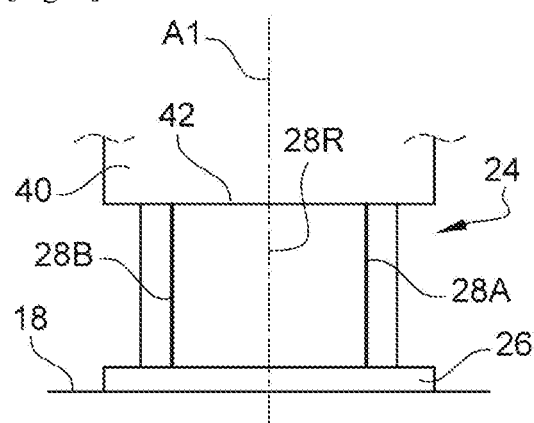
[Fig. 9]
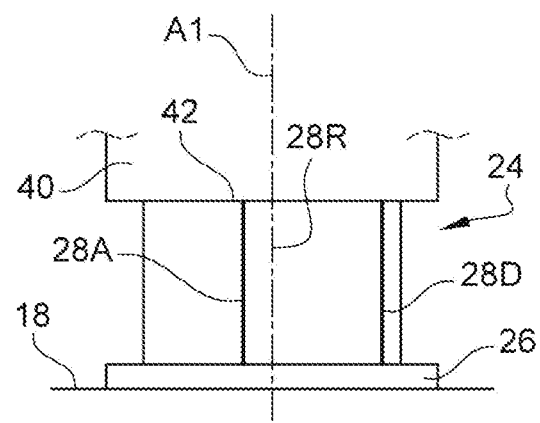

METHOD FOR ORIENTING A PREFORM IN A MOLD

TECHNICAL FIELD OF THE INVENTION

The invention relates to the domain of machines for manufacturing recipients made from thermoplastic material.

The invention relates more specifically to blowing machines used to make recipients from plastic using a preform previously obtained by injection molding, for example.

TECHNICAL BACKGROUND

Such a machine includes at least one molding unit provided with a blowing mold in which a preform is engaged, with a neck opening outside the mold. The molding unit has a blow pipe that can be moved between a retracted position and a blowing position, in which the pipe is held sealingly against the mold or against the neck of the preform for injection of the pressurized blowing fluid into the preform.

Machines of this type are commonly used to manufacture recipients such as bottles from preforms made of polyethylene terephthalate (PET). Relatively high blowing pressures are required to ensure the very precise shaping of the recipient, in particular in zones with complex shapes. Consequently, if the blowing fluid is air, blowing is usually performed at a pressure of approximately 40 bar. This high pressure draws the previously heated material of the preform and presses said material against the walls that form the impression of the mold. In most machines, a draw rod is inserted axially into the preform to bear against the closed end of the bottom of the preform at the same time as the pressurized fluid is injected therein. The draw rod thus helps to better control the axial deformation of the preform when blowing the recipient.

In such a method for obtaining a recipient, the neck of the recipient is formed directly into the final shape when injection molding the preform. This neck usually also has a thread to enable the cap to be screwed onto the recipient. In some cases, the preform must be oriented at a specific angle in relation to the blowing mold about the main axis thereof.

This is the case if neither the body of the recipient to be formed nor the cap used to close the recipient are bodies of revolution. In this case, the cap is usually oriented specifically in relation to the body once fully screwed onto the neck of the recipient, notably for esthetic reasons. In this case, the angular disposition of the thread of the neck in relation to the body of the recipient determines the final position of the cap once fully screwed on.

This is also the case when the body of the preform has been heated non-uniformly according to a "preferred" heating profile to obtain a final recipient that is not axisymmetric. Such a method for heating the preform involves applying more heat to zones of the preform that have to undergo greater drawing than zones that are heated less.

Furthermore, means enabling the preform to be oriented angularly in relation to the blowing mold have to be provided, since it is the blowing mold that determines the final shape of the body of the recipient.

Methods for orienting the preform following insertion into the mold have already been proposed. In these existing methods, the neck of the preform has a projecting marker that can be detected by an optical barrier sensor emitting a detection beam. The preform is rotated about the main axis thereof until the sensor detects the marker, notably when the marker breaks the beam of the barrier sensor. The preform is always rotated in the same direction when searching for the marker, regardless of the angular position of the preform when installing the preform in the mold.

Furthermore, it may be necessary to provide a step of correcting the angular position by rotating the preform in the other direction to take into account the reaction time of the sensor and to return the recipient to the correct angular position.

These methods are unsatisfactory since the preform may have to undergo a near-complete rotation before the sensor detects the marker. If the blowing machine is designed to blow large batches of recipients with a very high throughput, for example more than 80,000 recipients per hour, it must be possible to orient the recipient very quickly, regardless of the angular position of the recipient when the recipient is installed in the mold. The existing orientation methods therefore limit the production throughput of the blowing machine.

SUMMARY OF THE INVENTION

The invention proposes a method for orienting an axisymmetric preform, notably a preform made of thermoplastic material, in a forming mold of a blowing machine, a neck of the preform being provided with at least one marker enabling determination of the angular position of the preform about the main axis thereof in relation to a reference angular position that is static in relation to the mold, the method including:
- a step of installing the preform in a cavity of the mold, the neck projecting outside the mold,
- a step of orienting the preform thus installed, in which the preform is automatically rotated about the axis thereof in relation to the mold until the reference angular position is reached, characterized in that it includes an intermediate step (E2) involving detection of the current angular position of the preform and determination of an angle of rotation through which the preform has to be rotated to reach the reference angular position thereof, the orientation step being triggered on completion of the intermediate step.

According to another feature of the method undertaken according to the teachings of the invention, determination of the angle of rotation includes determination of a minimum angle (a) and of a related direction of rotation in which the preform has to be rotated to reach the reference angular position thereof.

According to another feature of the method undertaken according to the teachings of the invention, detection of the current angular position of the preform (14) includes:
- a first phase in which at least one image of the neck of the installed preform is captured by at least one image capture device that is arranged in a predetermined position in relation to the mold during image capture,
- a second phase in which at least one image is processed to detect the angular position of the marker in relation to the reference angular position.

According to another feature of the method according to the teachings of the invention, the blowing machine includes a blow pipe including a bell containing a member for driving the preform in rotation, the pipe being moved slidingly along the axis of the preform installed in the mold between:
- a retracted end position in which the pipe is completely separated from the preform and from the mold,
- an intermediate indexing position of the preform in which the drive member of the preform is engaged with the neck of the preform, the bell being arranged above and away from the mold such as to expose at least a portion of the neck including the markers to the image capture device, a blowing end position in which the bell is in contact with the mold completely surrounding the neck of the preform, the current angular position of the preform being detected when the pipe is in the intermediate indexing position.

According to another feature of the method according to the teachings of the invention, the neck of the preform has at least two markers, and a single image of the neck is captured by a single image capture device during the first image capture phase.

According to another feature of the method according to the invention, the neck of the preform has four markers arranged about the circumference of the neck.

According to another feature of the method according to the invention, the molding unit is carried on a carousel that rotates in relation to the ground, the at least one image capture device being carried on the carousel and arranged statically in relation to the mold.

According to another feature of the method according to the invention, the molding unit is carried on a carousel that rotates in relation to the ground, the at least one image capture device being static in relation to the ground such as to automatically capture the image of the neck during the first phase of the intermediate detection step when the carousel is in a given angular position in relation to the image capture device.

The invention also relates to a blowing machine designed to implement the method carried out according to the teachings of the invention. Such a blowing machine includes:

a carousel mounted rotatably in relation to the ground about a central axis, at least one molding unit that is carried on the carousel along a circular path, the molding unit including:

a mold including a cavity that is opened on an upper face of the mold by a through-hole for the neck of a preform, a blow pipe including a bell containing a member for driving a preform in rotation, the pipe being moved slidingly along the axis of the through-hole between:

an upper retracted end position when the molding unit is positioned in a first sector of the path thereof and in which the molding unit is completely separated from the mold, an intermediate indexing position when the molding unit) is positioned in a second sector) of the path thereof and in which the drive member is designed to be engaged with the neck of a preform installed in the mold, the bell being arranged above and away from the mold, a lower blowing end position when the molding unit is positioned in a third sector of the path thereof and in which the bell is in contact with the mold completely surrounding the through-hole, characterized in that the blowing machine includes at least one image capture device in which an image capture axis is oriented towards a given focus point of the molding unit corresponding to the intended location of the neck of the preform installed in the mold when the molding unit is in the second sector of the path thereof.

According to other features of the blowing machine made according to the teachings of the invention:

the at least one image capture device is mounted statically in relation to the ground such that the image capture axis thereof is oriented towards the given focus point when the molding unit is in a predetermined position of the path thereof in the second sector, the carousel carries several molding units, the given focus point of each of the molding units crossing the image capture axis of the at least one image capture device when said molding units occupy, in turn, said predetermined position of the path thereof, the at least one image capture device is fastened to the carousel such that the image capture axis thereof is permanently oriented towards the given focus point of the related molding unit.

SHORT DESCRIPTION OF THE FIGURES

Other features and advantages of the invention are given in the detailed description provided below with reference to the attached drawings, in which:

FIG. 1 is an axial cross-section view showing a molding unit made according to the teachings of the invention, with a preform installed in a mold thereof, and a pipe in a retracted end position, FIG. 2 is a view similar to the view in FIG. 1, in which the pipe is in an intermediate orientation position, a drive member for the pipe being engaged with the preform to enable the preform to be rotated, FIG. 3 is a view similar to the view in FIG. 1 showing the pipe in a working end position in which the pipe can inject a forming gas into the preform, FIG. 4 is an elevation view showing a carousel of a blowing machine carrying a plurality of molding units made according to the teachings of the invention, the blowing machine being fitted with an image capture device, FIG. 5 is a block diagram showing the different steps and phases of a method for orienting the preform in the mold of the molding unit made according to the teachings of the invention, FIG. 6 is a top view showing the neck of a preform entering a focus point of the image capture device, the preform being oriented in a first random angular orientation, FIG. 7 is a view similar to the view in FIG. 6 showing the preform oriented in second random angular orientation, FIG. 8 shows an image of the neck of the preform in FIG. 6 taken from the side by the image capture device in FIG. 6, FIG. 9 shows an image of the neck of the preform in FIG. 7 taken from the side by the image capture device in FIG. 7.

DETAILED DESCRIPTION OF THE INVENTION

In the remainder of the description and in the claims, reference is made to an axial direction oriented in the same direction as the axis of a preform installed in the mold in a non-limiting manner. The axial direction is used as a geometric reference unrelated to the direction of gravity. The term "horizontal" is used to indicate a plane orthogonal to the axial direction. The term "radial" is used to indicate directions extending horizontally from the axis of the preform installed in the mold, outwards from the inside.

The terms "upper", "lower", "top", "bottom", etc. used in this document refer to the configuration of the molding unit as illustrated in the figures in relation to the axial direction. However, the use of these terms should not be understood to limit the scope of the invention, which also applies to other orientations of the molding unit.

FIG. 1 shows a molding unit 10 for a blowing machine for blowing recipients from preforms made of thermoplastic material, such as PET. The example illustrated is a bottle blowing machine. The molding unit 10 has, in a known manner, a blowing mold 12 that usually comprises two or three parts that are moveable in relation to one another to enable a preform 14 to be inserted in a molding cavity 16 formed inside said mold 12, and to enable the recipient to be removed from the mold after the blowing operation. When the mold parts are assembled, the mold 12 has a globally planar upper face 18 that is traversed by an axially oriented through-hole 20 of axis "A1" that opens out into the cavity.

The preform 14 is a hollow body that is obtained by injection molding and that usually has an axisymmetric shape of main axis "A1". A body 22 of the preform 14 has a tubular shape closed at an axial end, which may arbitrarily be called the lower end, and is opened at the upper end. This upper end is intended to form the neck 24 of the preform 14 and is axisymmetric about the axis "A1". The external cylindrical wall of the neck 24 is provided with means for closing by cooperation with a cap, such as an external thread. When the preform 14 is installed in the mold 12, only the neck 24 projects outside the mold 12 via the through-hole 20.

The preform 14 has, usually at the base of the neck 24, a flange 26 that bears against the upper face 18 of the mold 12 about the perimeter of the through-hole 20. Thus, the molding unit 10 is designed such that the neck 24 of the preform 14 projects above the upper face 18 of the mold 12.

Hereinafter, and unless otherwise specified, reference shall be made in all cases to the preform 14 in this position installed in the mold 12.

For the requirements of the invention, the neck 24 of the preform 14 is provided with at least one marker 28A, 28B, 28C, 28D enabling determination of the angular position of the preform 14 about the main axis "A1" thereof in relation to a reference angular position that is static in relation to the mold 12. This enables implementation of a method for orienting the preform 14 in relation to the mold 12, as explained below.

The markers 28A, 28B, 28C, 28D are visual markers that appear in an image captured by the image capture device when said markers are illuminated using light in the visible spectrum and/or by light in a specific spectrum, which may be invisible to the naked eye.

The neck 24 of the preform 14 advantageously includes at least two markers arranged symmetrically in relation to the axis "A1". Thus, when viewing the neck 24 from the side, at least one marker will always be visible. In the example shown in the figures, the preform 14 has four visual markers 28A, 28B, 28C, 28D that are distributed regularly about the circumference of the neck 24 at 90° from one another about the main axis "A1" of the preform 14. The markers 28A, 28B, 28C, 28D are advantageously different from one another to enable determination of a unique angular position of the preform 14 by viewing just one of these markers. The visual markers 28A, 28B, 28C, 28D are for example marks added to the preform 14. The marks are for example made by transforming the material, notably using a laser on the neck 24 of the preform 14. The marks can also be made by depositing ink, for example by printing.

In a variant, the markers are made in relief directly from the material of the preform 14, such as notches and/or pins, or the threading of the neck 24 itself.

The markers 28A, 28B, 28C, 28D may be made on the flange 26 and/or on an external cylindrical axial face of the neck 24.

The molding unit 10 also has a blow pipe 30 that is arranged axially above the mold 12 and that is designed to be slid downwards along the axis "A1" of the through-hole 20 facing the neck 24 of the preform 14 to inject pressurized air therein, thereby forcing the material of the body of the preform 14 to deform into the shape of the cavity 16 of the mold 12.

According to a known design of blowing machines, the blow pipe 30 essentially comprises a tubular pipe body 32 that is moveable axially in the pipe holder 34 fastened to the molding unit 10. The pipe body 32 is traversed along the axis "A1" by a draw rod 36 that is moved axially by a cylinder, an electric motor or a cam/roller device (not shown) to engage in the preform 14 and to guide the axial deformation thereof during blowing.

In the example shown, the molding unit 10 is fitted with a bell pipe comparable to the pipe described in French patent FR 2764544. Thus, the lower end of the pipe body 32 is provided with a bell-shaped part 38 that is open at the lower end thereof to bear sealingly against the upper face 18 of the mold 12 about the neck 24 of the preform 14, as shown in FIG. 3, without bearing against this latter. Once the bell 38 is bearing against the mold 12, the pipe 30 is in sealed communication with the inside of the preform 14 to inject pressurized gas therein.

In a variant that is not shown, the lower end of the pipe 30 is in sealing contact with the neck 24 of the preform 14 to inject pressurized gas therein.

The pipe body 32, and therefore the bell 38, can be positioned axially between two end positions.

In FIG. 1, the pipe 30 is in a first end position, referred to as the retracted end position, in which the preform 14 can be loaded into the mold 12 and the recipient can be discharged once formed. In this retracted end position, the bell 38 is separated axially above the upper face 18 of the mold 12.

In FIG. 3, the pipe 30 is shown in a second end position, referred to as the working end position, in which the bell 38 bears sealingly against the upper face 18 of the mold 12 and surrounds the through-hole 20 and the neck 24.

The movement of the pipe 30 between these two end positions can be controlled in different ways. The sliding of the pipe 30 is advantageously controlled using a linear electric motor 39. The linear electric motor 39 is for example fastened to the pipe holder 34.

In a variant of the invention that is not shown, the sliding of the pipe 30 is controlled using a stepped pneumatic cylinder system. The molding unit 10 also includes a drive member 40 for orienting the preform 14 about the axis "A1" once the preform has been inserted into the mold 12. The drive member 40 is designed to engage, for example by friction, with the preform 14 to enable the preform 14 to be rotated without slipping. The drive member 40 in this case has a tubular shape of axis "A1".

By way of non-limiting example, the drive member 40 forms a stabilizing member that enables the preform 14 to be held in an installed position in the mold 12 during the forming operation, notably while the pressurized blowing gas is injected into the preform 14. The drive member 40 is separated axially from the preform 14 when the pipe 30 is in the retracted end position. The drive member 40 is designed to come into contact with the installed preform 14 when the pipe body 32 is moved axially from the retracted end position to an intermediate position between the two end positions thereof, referred to as the intermediate orientation position, which is shown in FIG. 2, in which the bell 38 is moved towards the upper face 18 of the mold 12 without coming into contact with the upper face 18 of the mold 12. As a result, at least a lower section of the neck 24 of the preform 14 remains visible from the outside.

In the example embodiment shown in the figures, the drive member 40 is designed to bear axially against a free circular upper edge 42, referred to as the rim, of the neck 24 of the preform 14. When the drive member 40 is driven in rotation, the drive member drives the preform 14 by friction. An axial clamping force "E" of the drive member 40 against the preform 14 guarantees the adherence required to drive the preform 14 in rotation. When the sliding of the pipe 30 is controlled by the linear motor 39, this axial clamping force "E" is advantageously controlled sufficiently to prevent the drive member 40 from slipping in relation to the preform 14, while enabling the flange 26 of the preform 14 to slide on the upper face 18 of the mold 12.

In a variant of the invention that is not shown, the drive member 40 is designed to be engaged by friction with the preform 14 via the inside of the neck 24. An elastic ring is then arranged about the drive member 40. The elastic ring is designed to be compressed radially when the drive member 40 is engaged axially in the neck 24 of the preform 14 in order to hold the preform 14 on the drive member 40 by friction.

According to another variant of the invention that is not shown, the drive member 40 grips the outside of the neck 24 of the preform 14, notably in the case of preforms 14 having a neck 24 of lesser diameter.

Regardless of the embodiment of the drive member 40, when coming into contact with the neck 24 of the preform 14, the external radial flange 26 arranged at the base of the neck 24 is advantageously used to enable the preform 14 to bear against the upper face of the mold 12.

The drive member 40 is mounted rotatably about the axis "A1" in relation to the mold 12 to enable the preform 14 to be rotated about the axis "A1" thereof when engaged with the neck 24 of the preform 14. The drive member 40 can be driven in rotation in both directions in a controlled manner by motorized rotational drive means, for example an electric motor 44. The electric motor 44 is controlled automatically by an electronic control unit 46, as shown in FIG. 2.

In a non-limiting manner, in the example shown in the figures, the drive member 40 is constrained to rotate with the bell 38 about the axis A1"," and the bell can rotate about said axis "A1" in relation to the pipe body 32, said bell being fastened to the lower end of said pipe body. Conversely, the bell 38 is constrained to move axially with the pipe body 32. The drive member 40 can slide axially in relation to this assembly when the pipe 30 moves from the intermediate orientation position to the working end position.

For example, the drive member 40 is guided slidingly into the bell 38 by flutes inside the bell 38, which also ensure that the bell 38 and the drive member 40 are constrained to rotate together about the axis A1"."

Such a rotary pipe 30 is well known in the prior art and shall not be described in greater detail. A detailed example of such a pipe 30 is provided in document EP 1261471 B1.

As shown in the figures, the drive member 40 is not entirely free to slide. Indeed, the drive member is pushed downwards by the lower end of a compression spring 48 extending axially inside the bell 38, the upper end of said spring bearing against a reaction surface constrained to move axially with the bell 38. The axial force exerted by the spring 48 on the drive member 40 must be greater than the axial clamping force "E" of the drive member 40 against the preform 14 to enable the preform 14 to be driven in rotation without slipping.

When the pipe body 32 is moved towards the working end position, as shown in FIG. 3, in which the bell 38 is pressed sealingly against the upper face of the mold 12, the drive member 40 descends no further since said drive member is bearing against the preform 14, which is in turn bearing against the mold 12. Furthermore, the possibility of relative slipping between the drive member 40 and the bell 38 is essential to enable the pipe 30 to reach the working end position, the spring 48 then being compressed between the drive member 40, which remains static, and the pipe body 32, which is moving downwards.

In this working end position, the draw rod 36 can traverse the drive member 40 axially via a central orifice in the drive member 40 to penetrate the inside of the preform 14, leaving sufficient radial space between the rod 36 and the inner wall of the drive member 40 to enable the pressurized air to be injected into the preform 14. Moreover, vents 50 are provided in the drive member 40 to ensure equal pressure at all times in the pipe 30, in the recipient during formation, and in the space formed by the bell 38 above the mold 12, to ensure that the neck 24 of the preform 14 is not subjected to a pressure difference liable to deform said neck. When the pipe 30 is in the working end position, the bell 38 bears against the mold 12 and therefore cannot rotate about the axis A1"," which also prevents rotation of the drive member 40. The drive member in turn prevents rotation of the preform 14, simply on account of the adherence caused by the axial force applied by the compressed spring 48.

Conversely, when the pipe 30 is in the intermediate orientation position shown in FIG. 2, the pipe can be rotated by the drive device. This drive device essentially comprises the electric motor 44 (as well as the related control module) that controls the rotation of a gear wheel 52 of axis "A2" parallel to the axis A1"." The electric motor 44 is in this case rigidly connected to the body 32 of the pipe.

The bell 38 has an external gear wheel 54 that meshes with the gear wheel 52 to enable the motor 44 to rotate the bell 38, and thereby the drive member 40. Preferably, the axial length of the gearwheel 52 ensures that the gearwheel 52 and the wheel 54 are always meshed with one another, regardless of the axial position of the bell 38. Indeed, although the rotary link is only actually essential when the pipe 30 is in the intermediate orientation position, this arrangement obviates remeshing issues.

As shown in the figures, the molding unit 10 according to the invention also includes at least one image capture device 56 for the neck 24 of the preform 14, such as a camera with a digital sensor. In the example chosen, this image capture device 56 is able to capture an image in which the markers 28A, 28B, 28C, 28D on the neck 24 of the preform 14 appear if said markers are in the field of vision thereof. Lighting means (not shown) for illuminating the neck 24 may also be provided to ensure a sharp image of the neck 24 during image capture. The lighting means are for example built into the image capture device 56.

As shown in FIG. 4, such identical molding units 10 are fitted to a high-speed mass recipient blowing machine 58. The molding units 10 are carried on a carousel 60 that is mounted rotatably in relation to the ground about a central axis "B" parallel to the axis "A1" in the direction indicated by the arrow "F", in this case clockwise. The molding units 10 are placed on a shared circular path centered on the central axis "B".

In general, the circular path of the molding units 10 is split into three separate sectors. In a first loading/unloading sector S1"," the pipe 30 is moved to the retracted end position to enable insertion of a preform 14 into the mold 12, for example the preform 14 is carried by a clamp 62, as shown in FIG. 1.

The pipe 30 is moved to the intermediate orientation position in a second sector "S2" arranged immediately downstream of the first sector "S1". The clamp 62 is then withdrawn.

Finally, in a third blowing sector "S3", the pipe 30 is in the working end position to enable the preform 14 to be shaped into the final recipient. At the output of the third sector "S3", the molding unit 10 returns directly to the first sector "S1" in which the pipe 30 is moved to the retracted end position to enable removal of the finished recipient and insertion of a new preform 14 to start a new formation cycle.

The method for orienting the preform 14 in a given molding unit 10 is implemented when said molding unit 10 is in the second sector "S2" of the path. Where the blowing machine 58 is intended to shape large batches of recipients, each molding unit 10 passes through the second sector "S2" of the path very quickly, in much less than one second. For example, after entering the second sector "S2", the pipe 30 takes 100 milliseconds to descend from the retracted end position to the intermediate orientation position. The pipe 30 then stays in the intermediate orientation position for approximately 75 milliseconds before the forming unit 10 enters the third sector "S3" of the path, in which the pipe 30 is moved to the working end position. In such a configuration, the preform 14 has to be oriented in relation to the mold 12 while the pipe 30 is actually in the intermediate orientation position, i.e. during a window of approximately 75 milliseconds.

The invention proposes a method for orienting the preform 14 within this window.

As shown in FIG. 5, the method primarily includes:
- a step "E1" of installing the preform 14 in the cavity 16 of the mold 12, the neck 24 projecting outside the mold 12, as explained above,
- an intermediate detection step "E2" of the current angular position in relation to the mold 12 to determine a minimum angle "α" of rotation and the related direction of rotation in which the preform 14 has to be rotated about the axis "A1" thereof to reach the reference position thereof,
- finally, a step "E3" of orienting the preform 14 thus installed, in which the preform 14 is automatically rotated through said angle "α" of rotation and in said direction about the axis "A1" thereof in relation to the mold 12 into the reference angular position.

The second step "E2" notably enables determination of the direction in which the preform 14 has to be rotated to reach the reference position thereof as quickly as possible. Indeed, to match the position of a marker 28A with a reference point 28R, the preform 14 can be rotated in either direction about the axis "A1" thereof. However, the angle of rotation will be greater in one of two directions. For example and with reference to FIG. 6, by turning the preform 14 clockwise through the angle "a", the reference point 28R can be reached much more quickly than by turning the preform 14 counterclockwise through the angle "360°-α". Similarly and as shown in FIG. 7, the preform 14 need only be rotated clockwise through the angle "a" to bring the marker 28A to the reference point 28R. By rotating the preform 14 in the appropriate direction, the minimum angle "α" of rotation of the preform will never exceed 180°.

The intermediate detection step "E2" is carried out when the pipe 30 is in the intermediate orientation position.

The detection step "E2" includes a first phase "P1" in which at least one image of the neck 24 of the installed preform 14 is captured by the image capture device 56 that is arranged in a predetermined position in relation to the mold 12 during image capture. Such images are for example shown in FIGS. 8 and 9. As a whole, the field of vision of the image capture device 56 is in the form of a cone having a main axis "A3" referred to as the image capture axis "A3". As shown in FIG. 2, the image capture device 56 is arranged such that, when an image is taken, the image capture axis "A3" thereof is oriented towards the neck 24 such as to capture an image showing the outer face of one side of the neck 24 when the pipe 30 is in the intermediate orientation position. In the example shown in FIG. 2, the image capture axis "A3" is arranged as a whole radially in relation to the axis "A1" of the preform 14, at the same level as the neck 24.

The image capture device 56 is arranged outside the bell 38. Thus, when the pipe 30 is in the working end position, as shown in FIG. 3, the bell 38 entirely conceals the neck 24. However, in the intermediate orientation position, the bell 38 is arranged above and away from the mold 12 such as to expose at least the portion of the neck 24 including the markers 28A, 28B, 28C, 28D to the image capture device 56.

According to the embodiment shown in FIG. 4, the image capture device 56 is mounted statically in relation to the ground and the image capture axis "A3" thereof is oriented towards the given focus point "T", which is static in relation to the ground, of the second sector "S2" of the path of the molding units 10. The focus point "T" is the location of the neck 24 of a preform 14 installed in a mold 12 when the molding unit 10 moves to a predetermined position on the path. The predetermined position is defined as the position in which the pipe 30 of the molding unit 10 has just reached the intermediate orientation position from the retracted end position.

Thus, the image capture device 56 is able to automatically capture the image of the neck 24 "on the fly" as each molding unit 10 passes the focus point "T", in the image capture axis "A3" of the image capture device 56, the carousel 60 then occupying a given angular position about the axis "B" thereof in relation to the image capture device 56. Thus, a single image capture device 56 is enough to capture an image of the neck 24 of each of the molding units 10, each molding unit 10 crossing the image capture axis "A3" of the image capture device 56 when said molding unit occupies, in turn, said predetermined position of the path thereof. In the example shown in the figures, the preform 14 has four visual markers 28A, 28B, 28C, 28D that are arranged regularly about the circumference of the neck 24 at 90° from one another about the main axis "A1" of the preform 14. Preferably, the neck 24 has at least two markers so that at least one marker is always visible in the image of the neck 24 captured by the image capture device 56. Thus, in the example shown, a single image of the neck 24 is captured by a single image capture device 56 during the first phase "P1".

In a variant, several image capture devices 56 are mounted statically in relation to the ground. The image capture axes "A3" of each of the image capture devices 56 are oriented towards the axis "A1" of a preform installed in a molding unit 10 passing said focus point "T". This enables each of the image capture devices 56 to simultaneously capture the same neck 24 from different angles. Thus, when the image capture devices 56 are arranged such as to together cover the entire external cylindrical face of the neck 24, the neck 24 may be provided with just a single marker.

According to another variant of the invention that is not shown, the image capture device is carried on the carousel and is static in relation to the mold. Thus, each molding unit has a related image capture device in which the image capture axis "A3" is permanently oriented towards the focus point (T) of the related molding unit.

The image capture device 56 is able to communicate the captured image of the neck 24 to the electronic control unit 46, for example over a wired link or using a suitable electromagnetic signal.

During a second processing phase "P2" of the second detection step "E2", the image captured by the image capture device or devices 56 is computer processed to detect the angular position of a marker 28A, 28B, 28C, 28D visible in the image in relation to the reference angular position. For this purpose, the electronic control unit 46 is provided with image processing software that identifies the marker or markers 28A, 28B, 28C, 28D appearing in the image. Once the position of the markers 28A, 28B, 28C, 28D has been identified in the image, a third phase "P3" is triggered in which the angle "α" of rotation required for the preform 14 to reach the reference position during the orientation step is determined by the electronic control unit 46.

As shown in FIGS. 8 and 9, since the position of the image capture device 56 is static, the location, referred to as the reference point 28R, where the marker or markers 28A, 28B, 28C, 28D need to be positioned in the image for the preform 14 to be in the reference angular position is invariable. This reference point 28R is determined before the method is implemented. The electronic control unit 46 calculates the angle "α" of rotation as a function of the transverse distance between this reference point 28R and the current position of the marker 28A, 28B, 28C, 28D identified in the image. Depending on the current position of the marker 28A, 28B, 28C, 28D in relation to the reference point 28R, to the right or to the left as shown in the figures, the electronic unit 46 also determines the direction of rotation required for the preform 14 to reach the reference position as quickly as possible. The entirety of this second step "E2" is for example completed in 6 milliseconds.

During the third step "E3", the electronic control unit 46 uses these two parameters (direction of rotation and angle "α" of rotation) to instruct the motor 44 to rotate the preform 14 to the reference angular position. This step takes less than 70 milliseconds to complete because the preform 14 is rotated through an angle not exceeding 180° on account of the method enabling the direction of rotation to be determined before the preform 14 is rotated.

During implementation of the method, a preform 14 is first installed by a clamp 62 in the mold 12 during the first step "E1", while the molding unit 10 is passing through the first sector "S1" of the circular path thereof. The pipe 30 is then in the retracted end position.

When said molding unit 10 enters the second sector "S2" of the path, after the pipe 30 has been moved to the intermediate position and after the clamp 62 has been withdrawn, the first phase "P1" of the second detection step "E2" is triggered. When the neck 24 of the preform passes the focus point "T", the image capture device 56 captures a side image of the neck 24.

This image is analyzed by the electronic control unit 46 during the second phase "P2". The electronic control unit 46 then determines the angle "α" of rotation and the direction of rotation required for the preform 14 to reach the reference angular position in the mold 12.

During the third orientation step "E3", the electronic control unit 46 instructs the motor 44 to rotate the preform 14 in said direction and through said angle "α" of rotation to bring the preform to the reference angular position.

Throughout the method, the carousel is rotated continuously, such that the molding unit 10 continues to pass through the second sector "S2" of the path thereof.

On completion of the method, the preform 14 leaves the second sector "S2" of the path and enters the third angular sector "S3", in which the pipe 30 is moved to the working end position, thereby blocking the preform 14 in the reference angular position throughout the duration of the formation process thereof.

The invention advantageously enables the preform 14 to be oriented very quickly, notably determining the direction of rotation required to reach the reference angular position as quickly as possible before the preform is oriented.

The invention claimed is:

1. A method for orienting an axisymmetric preform of a main axis in a forming mold of a blowing machine, a neck of the preform being provided with at least one marker enabling determination of the angular position of the preform about the main axis thereof in relation to a reference angular position that is static in relation to the mold, the method including:
   installing the preform in a cavity of the mold, the neck projecting outside the mold,
   detecting the current angular position of the preform and calculating an angle of rotation through which the preform has to be rotated to reach the reference angular position thereof, wherein calculating the angle of rotation includes determination of a minimum angle and of a related direction of rotation in which the preform has to be rotated to reach the reference angular position thereof, and
   orienting the preform thus installed, in which the preform is automatically rotated about the axis thereof in relation to the mold until the reference angular position is reached, wherein the orienting is triggered on completion of the detecting.

2. The method as claimed in claim 1, wherein the detecting of the current angular position of the preform includes:
   a first phase in which at least one image of the neck of the installed preform is captured by at least one image capture device that is arranged in a predetermined position in relation to the mold during image capture, and
   a second phase in which at least one image is processed to detect the angular position of the marker in relation to the reference angular position.

3. The method as claimed in claim 1, wherein the blowing machine includes a blow pipe including a bell containing a member for driving the preform in rotation, the pipe being moved slidingly along the axis of the preform installed in the mold between:
   a retracted end position in which the pipe is completely separated from the preform and from the mold,
   an intermediate indexing position of the preform in which the drive member of the preform is engaged with the neck of the preform, the bell being arranged above and away from the mold such as to expose at least a portion of the neck including the markers to the image capture device,
   a blowing end position in which the bell (38) is in contact with the mold completely surrounding the neck of the preform,
   wherein the current angular position of the preform being detected when the pipe is in the intermediate indexing position.

4. The method as claimed in claim 1, wherein the neck of the preform has at least two markers, and in that a single image of the neck is captured by a single image capture device during the first image capture phase.

5. The method as claimed in claim 4, wherein the neck of the preform has four markers arranged about the circumference of the neck.

6. The method as claimed in claim 1, wherein the molding unit is carried on a carousel that rotates in relation to the ground, the at least one image capture device being carried on the carousel and arranged statically in relation to the mold.

7. The method as claimed in claim 1, wherein the molding unit is carried on a carousel that rotates in relation to the ground, the at least one image capture device being static in relation to the ground such as to automatically capture the image of the neck during the first phase of the detecting when the carousel is in a given angular position in relation to the image capture device.

8. A blowing machine for implementing the method as claimed in claim 1, the machine comprising:
 a carousel,
 at least one molding unit that is carried on the carousel along a path, the molding unit including:
  a mold including a cavity that is opened on an upper face of the mold by a through-hole for the neck of a preform,
  a blow pipe including a bell containing a member for driving a preform in rotation, the pipe being moved slidingly along the axis of the through-hole between:
   an upper retracted end position when the molding unit is positioned in a first sector of the path thereof and in which the molding unit is completely separated from the mold,
   an intermediate indexing position when the molding unit is positioned in a second sector of the path thereof and in which the drive member is designed to be engaged with the neck of a preform installed in the mold, the bell being arranged above and away from the mold,
 a lower blowing end position when the molding unit is positioned in a third sector of the path thereof and in which the bell is in contact with the mold completely surrounding the through-hole,
 wherein the blowing machine includes at least one image capture device in which an image capture axis is oriented towards a given focus point of the molding unit corresponding to the intended location of the neck of the preform installed in the mold when the molding unit is in the second sector of the path thereof, the image capture device comprising a digital sensor so as to calculate the angle of rotation of the preform.

9. The machine as claimed in claim 8, wherein the at least one image capture device is mounted statically in relation to the ground such that the image capture axis thereof is oriented towards the given focus point when the molding unit is in a predetermined position of the path thereof in the second sector.

10. The machine as claimed claim 9, wherein the carousel carries several molding units, the given focus point of each of the molding units crossing the image capture axis of the at least one image capture device when said molding units occupy, in turn, said predetermined position of the path thereof.

11. The machine as claimed in claim 8, wherein the at least one image capture device is fastened to the carousel such that the image capture axis thereof is permanently oriented towards the given focus point of the related molding unit.

12. The method as claimed in claim 1, wherein the neck of the preform has at least two markers, and in that a single image of the neck is captured by a single image capture device during the first image capture phase.

13. The method as claimed in claim 2, wherein the neck of the preform has at least two markers, and in that a single image of the neck is captured by a single image capture device during the first image capture phase.

14. The method as claimed in claim 3, wherein the neck of the preform has at least two markers, and in that a single image of the neck is captured by a single image capture device during the first image capture phase.

15. The method as claimed in claim 1, wherein the molding unit is carried on a carousel that rotates in relation to the ground, the at least one image capture device being carried on the carousel and arranged statically in relation to the mold.

16. The method as claimed in claim 2, wherein the molding unit is carried on a carousel that rotates in relation to the ground, the at least one image capture device being carried on the carousel and arranged statically in relation to the mold.

17. The method as claimed in claim 3, wherein the molding unit is carried on a carousel that rotates in relation to the ground, the at least one image capture device being carried on the carousel and arranged statically in relation to the mold.

18. The method as claimed in claim 1, wherein the molding unit is carried on a carousel that rotates in relation to the ground, the at least one image capture device being static in relation to the ground such as to automatically capture the image of the neck during the first phase of the detecting when the carousel is in a given angular position in relation to the image capture device.

19. The method as claimed in claim 2, wherein the molding unit is carried on a carousel that rotates in relation to the ground, the at least one image capture device being static in relation to the ground such as to automatically capture the image of the neck during the first phase of the detecting when the carousel is in a given angular position in relation to the image capture device.

* * * * *